Oct. 8, 1963

R. O. STOEHR ETAL 3,106,614

CALLING STATION DETECTOR

Filed Oct. 13, 1958

INVENTOR.
RUDOLPH O. STOEHR
BY GEORGE J. DAVID

ATTY.

United States Patent Office 3,106,614
Patented Oct. 8, 1963

3,106,614
CALLING STATION DETECTOR
Rudolph O. Stoehr, Des Plaines, and George J. David, Chicago, Ill., assignors to Automatic Electric Laboratories, Inc., a corporation of Delaware
Filed Oct. 13, 1958, Ser. No. 766,915
10 Claims. (Cl. 179—18)

This invention pertains to automatic toll ticketing telephone systems, particularly to line and party detecting apparatus which permits frequency-per-terminal operation and records given particulars of certain calls processed through the system. More particularly, this invention relates to an improved detector to be used in conjunction with an automatic toll ticketing system of the type disclosed in the co-pending U.S. application of J. E. Ostline, I. V. Coleman and J. W. Taugner, Serial No. 628,474, filed December 3, 1956, now Patent 3,019,295, issued January 30, 1962.

The detector in an automatic toll ticketing telephone system is that equipment which automatically senses the directory number of a calling subscriber station making a toll call. This number becomes part of a call record which is automatically recorded by a ticketer at the termination of each completed customer dialled toll call. Earlier detectors were limited in the detection of party line stations, either by the necessity to utilize the frequency-per-hundred group method of operation or the requirement that each station have, associated with its terminal equipment, an electromechanical relay peculiar thereto. While the terminal-per-station and frequency-per-hundred terminal group method of providing party station service in automatic exchanges is well-known and widely used, this system is too inflexible to be readily adapted to the movement of party station subscribers within an exchange area. In order to conserve outside plant facilities, a movement of a party line subscriber within an exchange area requires the changing of his directory listed station number. This inflexibility is caused by the inherent drawback of the existing systems which require physical connection of the line terminal to a particular party relay to maintain the same directory number associated with the station. Because of this inflexibility, a change of residence of a party station subscriber necessitates a change of that subscriber's directory number and the attendant increase in information equipment necessary and operator requirements as well as restricting maintenance of balanced connector loads.

The terminal-per-station party service plan with frequency-per-terminal ringing is recognized as the best system for maintaining existing directory listings when party service subscribers move within an exchange and for maintaining efficient distribution of connector traffic in an exchange. In the past it has been necessary to weigh these advantages against the increased cost and space requirements which are attendant upon the inclusion of a relay in the central office equipment for each station. The new and improved detector of this invention permits a frequency-per-terminal operation without the inclusion of a relay for each line in the exchange and thereby eliminates the cost and space requirement objections to the use of such a system.

Accordingly, it is the primary object of this invention to provide a telephone system with a new and improved detector which is operable in a frequency-per-terminal basis without electromechanical equipment peculiar to each terminal.

Another object of this invention is to provide a telephone system for operation on a frequency-per-terminal basis with a new and improved detector adapted to the use of readily replaceable components.

Another object of this invention is to provide a telephone system of simplified components which is adapted to simplified installation techniques.

Still another object of this invention is to provide an automatic toll ticketing telephone system with facilities for rapid and convenient re-assignment of party line equipment without change in directory number.

Yet another object of this invention is to provide an automatic toll ticketing telephone system with a detector which is adapted to low cost fabrication techniques.

Another object of this invention is to provide an automatic toll ticketing telephone system with new and improved detector of reduced space requirements for central office equipment.

These and other objects of this invention will be apparent to one skilled in the art from the following detailed description when taken in conjunction with the drawings wherein.

Generally, the calling station detector apparatus of this invention consists of an equipment rack 11 on the front of which is located a small prefabricated patch field or unit 12 and a plurality of access units 17.

The prefabricated patch field 12 comprises a framework 13 which mounts 100 bunching blocks 14 and 100 terminal strips 16. Through this arrangement, the patch field, even though of small size, permits party-line group assignments of up to two thousand stations.

The equipment rack 11 is adapted to position up to twenty prefabricated units 17 in proximity, for easy interconnection, to the above-mentioned patch field. Each access unit 17 includes a terminal block 18 for connection to the telephone system and gating means comprising one hundred potential activated gating circuits each consisting of a gas filled diode 19 and a resistor 21 mounted with appropriate circuit connections on a printed circuit board 22. The one hundred gating circuits are distributed on three separate boards 22 which are positioned and secured in place on the access unit 17 by a pair of removable connector strips 23 and 24. This unique arrangement of circuit boards and connecting strips facilitates rapid replacement of a printed circuit board in the case of component failure.

Figures 8, 9A, 9B, 10, 11:
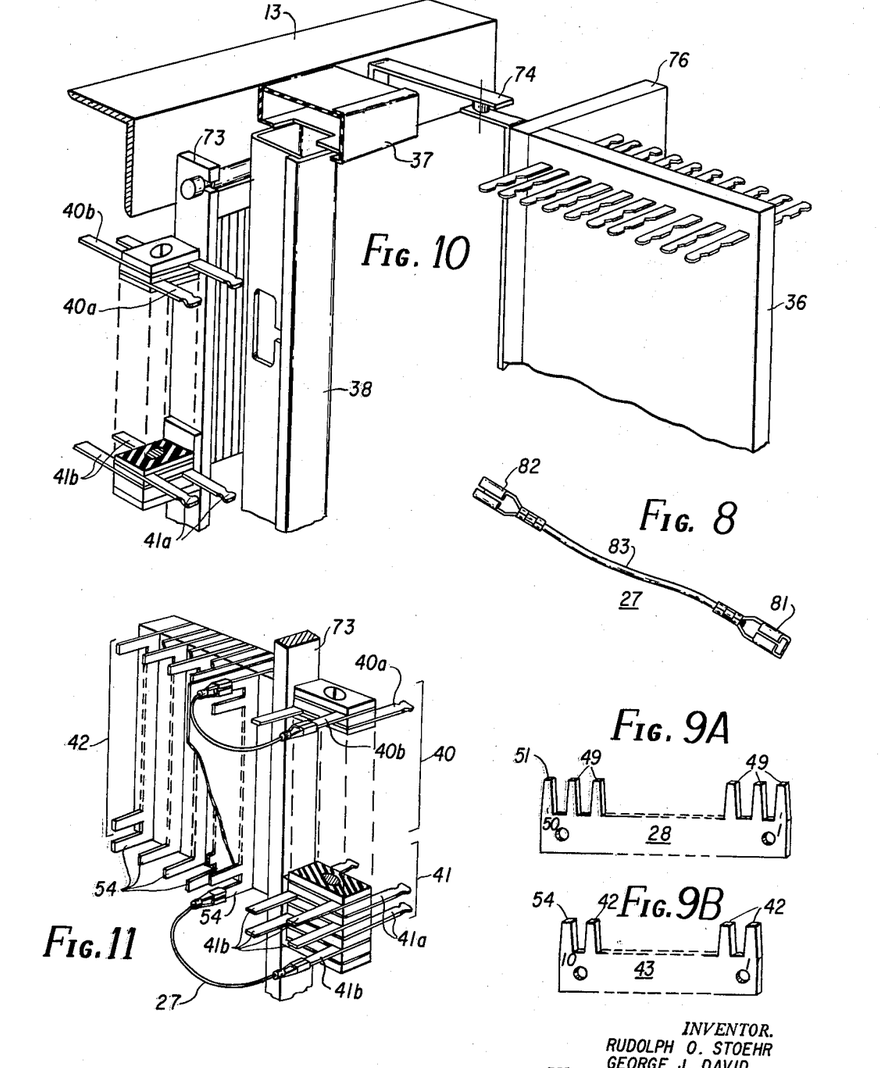
FIG. 8 is an enlarged perspective view of a jumper assembly utilized in this invention.
FIGS. 9A and 9B are enlarged perspective views of a party-line bus of the bunching blocks utilized in this invention.
FIG. 10 is an enlarged perspective view of the patch unit showing the method of connecting machine cable conductors to the patch terminal strip and the patch unit terminal block to the patch terminal strip.
FIG. 11 is an enlarged partial perspective view of the patch unit showing the method of jumpering between the patch terminals strip and a patch bunching block.

Each access unit 17 also includes a commoning means or bunching blocks 26 whereby leads from each of the gating circuits are extended through easily transferable jumpers 27 (as shown in FIG. 8) to one of a plurality of input terminals 49 on a selected bus of the five-party line group of busses 28 on the bunching block 26 to multiple a connector group of one hundred calling stations on a party-line basis. Each party-line bus 28 is extended, through terminals on the unit terminal block 18 of the access unit 17 to an associated contact on one of the MC party-line relays 29 which are controlled by a ticketer 31 found in the automatic toll ticketing telephone system.

The unit terminal block 18 of each access unit is provided with a plurality of terminals 32 each for accommodating a circuit connection from a connector terminal in the telephone system which is directly associated with one and only one station in the telephone system.

Three bar relays 33 are compactly mounted on each access unit. The relays 33 each have a plurality of circuit connections made to the wires of a machine cable 34 for extension to the above-mentioned patch field 12.

The connections to the appropriate terminal strips 16 on the patch field 12 are wired through a system of conduits, comprising ducts 37, 38, and 39, to eliminate the necessity for preformed cable for circuit connections on the patch unit. Because of the organization of the access unit in proximity to the patch units, machine cables of relatively short lengths can be used to interconnect the units. This, along with the advantages of conduit wiring, facilitates and simplifies the installation of a compact detector from the prefabricated units.

The terminal strips 16 have positioned thereon a plurality of individual terminals 40 which are selectively interconnected, by means of removable jumpers 27 (FIG. 8) through one of a plurality of terminals 42 formed on each party-line bus 43 of the adjacent patch unit bunching block 14. Each bunching block 14, which is similar to the bunching block 26 in the access unit, is located immediately adjacent to its associated terminal strip to permit the use of short jumpers and eliminate the extensive physical entanglement of wires.

All circuits coming into the patch unit 12 are jumpered to a party-line bus 43 which is indicative of the party designation of the associated calling station. Each party-line bus 43 is in turn jumpered back through its associated terminal strip 16 from whence it is connected to a common party group terminal of the unit terminal block 36. The circuits are then extended through the terminal block 36, similarly to those of the access unit, to a contact on one of a group of DU party relays 44 which are controlled by the ticketer 31.

The bar relays 33 of each access unit 17 are operated by the extension of potential from the first of two registers 46 and 47 employed to register the decimal digits of each calling station directory number, the first or MC register 46 being used for the first two decimal digits and the second or DU register 47 for the third and fourth decimal digits of the calling station directory number. Operation of the MC register 46 to register the first two decimal digits, extends ground back to the access unit 17 associated with that group in which the calling station is located. The extension of ground back to the access unit operates the bar relays 33 to extend the identifying potential associated with the calling station from the point C to a circuit path that extends through the patch unit 12 to the DU register 47 where the last two digits of the calling station directory number are registered.

Thus the reassignment of detection equipment, made necessary by a change in the party-line grouping designation of a subscriber, is made possible and practical by use of removable jumpering provided in the access unit 17 between the gating circuits and the party bunching block 26, and in the patch unit 12 between the terminal strips 16 and the party bunching block 14 to facilitate simple and speedy reassignment of the equipment. This ease of reassignment, plus the resultant size and cost reduction, stemming from the elimination of electromechanical devices associated with each calling station serves to best illustrate the advance of the detector of this invention over a prior art.

The savings which have been manifested in the elimination of electromechanical devices associated with each station is accomplished by a technique of sequential registration of the calling station number rather than a simultaneous registration as in previous frequency-per-terminal detectors. While a time element undoubtedly enters into any system of sequential registration, the lapsed time between first and second registration is of such slight magnitude as to be of little or no importance.

Figure 12:
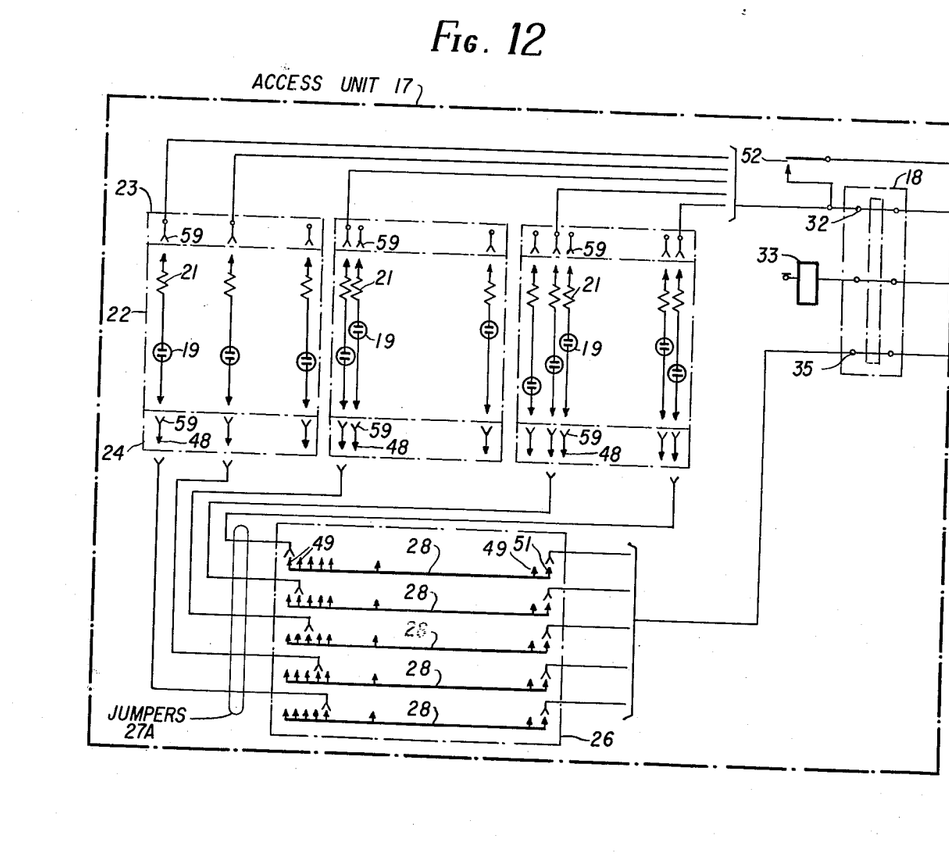
FIGS. 12 and 13, taken in combination, are a general circuit diagram illustrating the operation of the detector of this invention in a telephone system.
Figure 13:
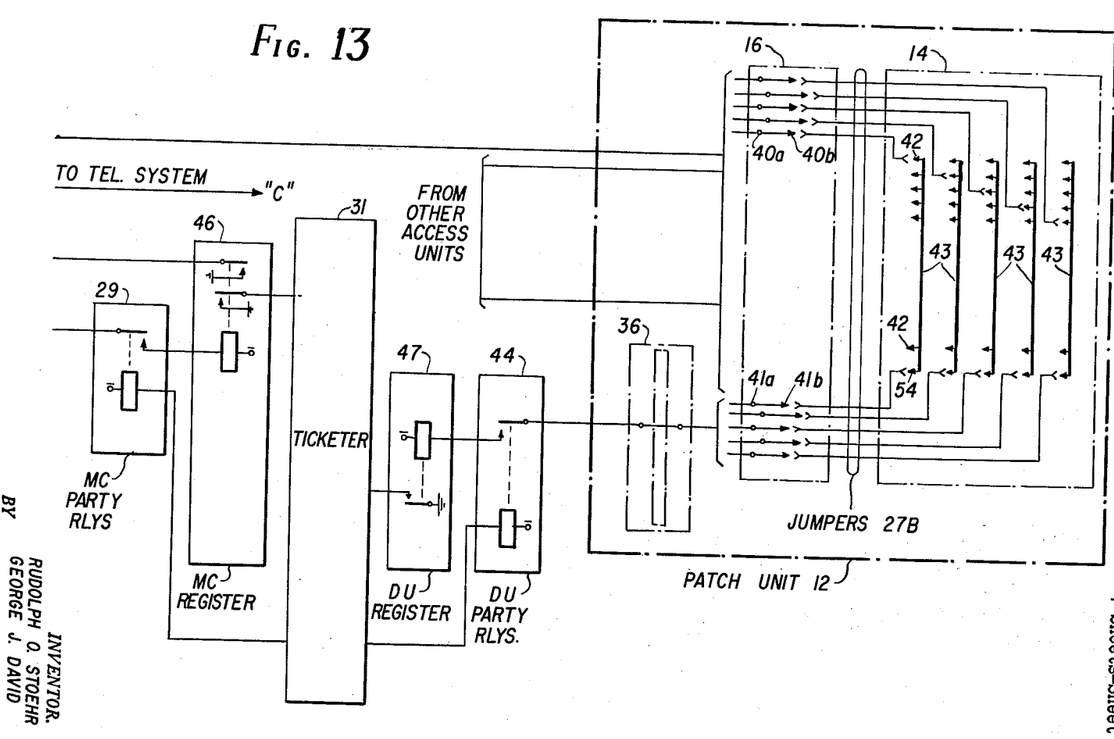

A better understanding of the scope of this invention may be had by reference to FIGS. 12 and 13 which represent a circuit embodying the detector of this invention. An identifying potential associated with a calling station is developed in any well-known manner—such as that described in the above-mentioned co-pending U.S. application, Serial No. 628,474—at the point C upon the initiation of a call by the calling station.

The developed identifying potential is connected through the access unit terminal block 18 by permanent circuit connections, such as soldered connections, to the one of the connecting strips 23 each of which is slidably engaged with the printed circuit board 22 and electrically connected to the potential actuated circuits thereon which perform a gating function for the circuit. The potential is extended over the printed circuit connections to a resistor 21 and a gas diode 19 on the printed circuit board 22. The circuit board is slidably connected to a connecting strip 24 which has terminals 48 formed at the end opposite to the printed circuit board to extend the potential, through removable jumpers 27a, to any one of the input terminals 49 on one of the five party-line busses 28 shown as part of the bunching block 26.

Each output terminal 51 on the party-line busses of the bunching block 26 is wired, through the unit terminal block 18, to the MC party relays 29 which are common to the telephone system. Thus, if the potential developed at point C is of sufficient magnitude to render that diode associated with the calling station conductive, a circuit connection from that point through the party bunching block 26 out to the MC party relays 29 is established. The MC party relay 29 associated with the party designation of the calling station is operated by party identity equipment which is part of the ticketer 31 in any well-known manner such as that described in the above-mentioned co-pending U.S. application, Serial No. 628,474, to complete a circuit to the MC register 46. Operation of the register extends ground potential, on a codel (two markings out of four) basis, to record the first two decimal digits of the calling station directory number in the ticketer 31.

Operation of the MC register 46 also extends ground back to the access unit 17 through its terminal block 18 to operate the adjacent bar relay 33. Operation of the relay 33 completes a circuit for transmission of the identifying potential from point C through a contact 52 on the relay 33 to the patch unit 12 and extending from the patch unit, through the conduits 37 and 38, to the terminal strip 16. The circuit is further extended from the terminal strip, by means of the removable jumpers 27b, to any one of the input terminals 42 on the party line busses 43 of the nearby bunching block 14. The circuit is extended from the party line bus through its output terminal 54 by the removable jumpers 27b, back to the terminal strip 16 which is in turn connected over permanent circuit connections running through the conduits 38 and 39 to the unit terminal block 36. The circuit connections from each party line bus 43 are extended from the patch unit terminal block 36 to the DU party relays 44 which are operated in a manner similar to that of the MC party relays 29 as described above.

Operation of the proper party DU relay associated with the calling station extends potential to the DU register 47 to mark the tens and units decimals of the calling station directory number, and extends ground potential to the ticketer 31 on a codel basis in a manner similar to that described above.

Upon recording the four decimal digits of the calling station directory number, the ticketer 31 releases the associated MC and DU party relays thereby breaking the circuit path from the register back to the point C, and interrupting the sustaining voltage that maintains the circuit through the diode 19, to render the diode nonconductive. Thus, the detector is released and conditioned for subsequent detection of another calling station directory number.

Figure 1:
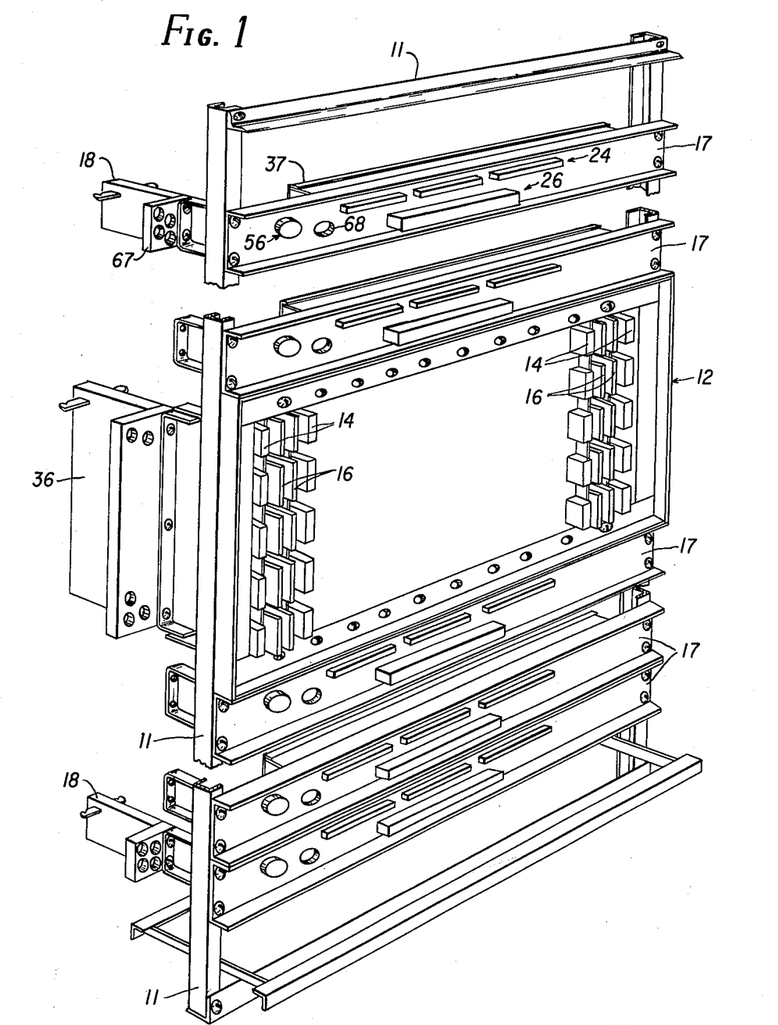
FIG. 1 is a perspective view of a detector embodying this invention.
Figure 2:
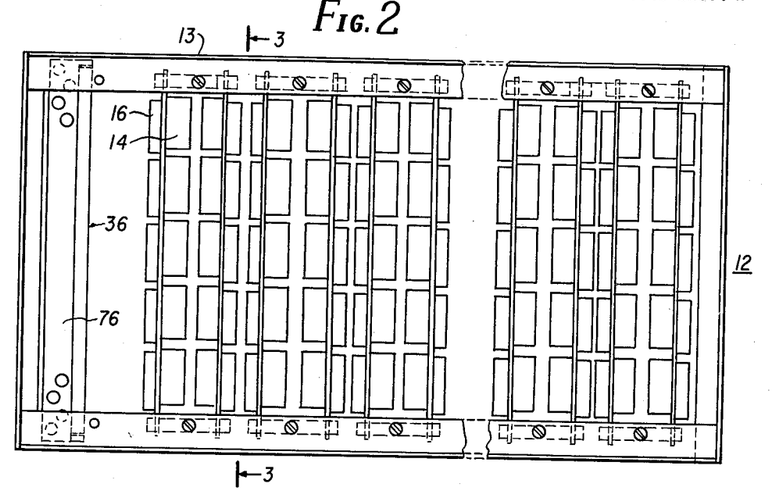
FIG. 2 is an elevational view of the patch unit of this invention.
Figure 3:
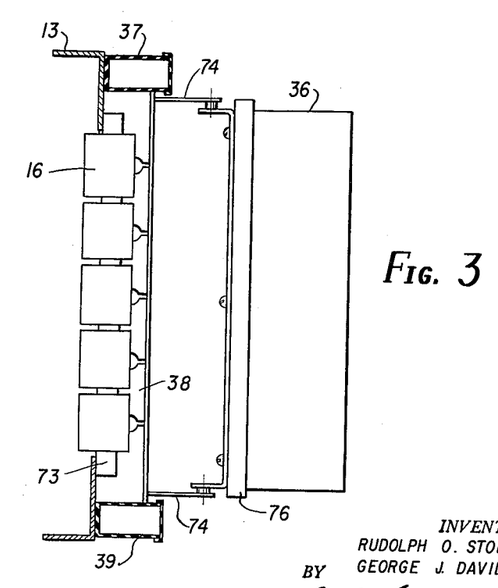
FIG. 3 is a sectional view taken along line 3—3 of FIG. 2.

Referring now to FIG. 1 for a mechanical description of the organization of this invention and its component parts, the calling station detector apparatus consists of a stanadard telephone type equipment rack 11 having a patch field assembly 12 centrally mounted thereon and twenty access units 17 secured to the rack 11 in close proximity above and below the patch field 12. Each access unit 17 provides access facilities for one hundred stations in the telephone system. The equipment mounted on each rack will enable calling station detection of two thousand stations and the associated patch fields of up to five detector racks may be multiplied so as to provide detection facilities for a maximum of ten thousand stations.

The jumpers of the detector of this invention are shown in detail in FIG. 8 and comprise a length of flexible insulated conductor 83 having friction type electrical connectors 81 and 82 connected on either end thereof. The connectors 81 and 82 are adapted to engage certain terminals of the detector to provide a removable conductor between selected points therein.

Figure 4:
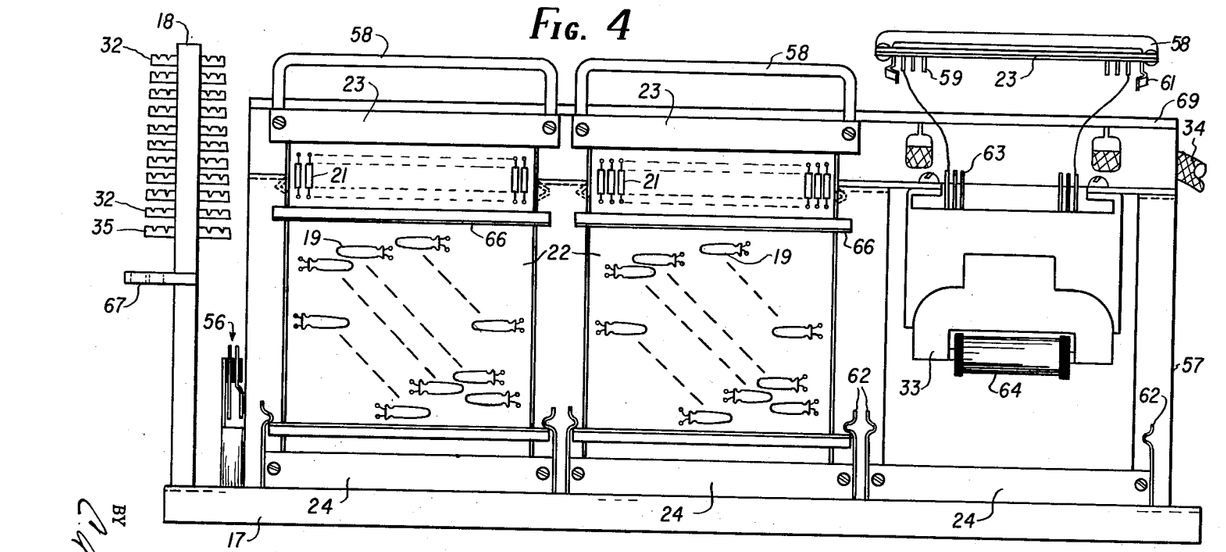
FIG. 4 is a top plan view of the access unit of this invention.
Figure 5:
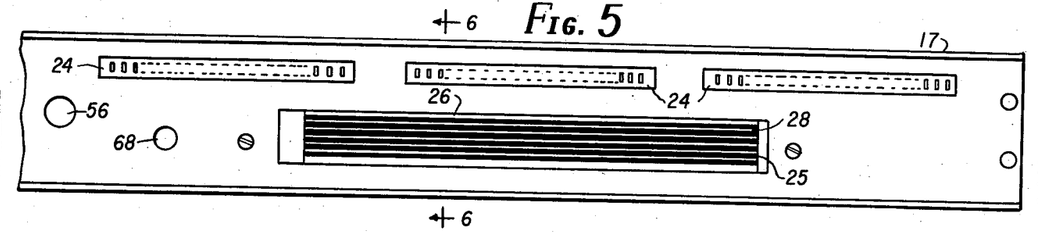
FIG. 5 is a partial elevational view of an access unit.
Figure 6:
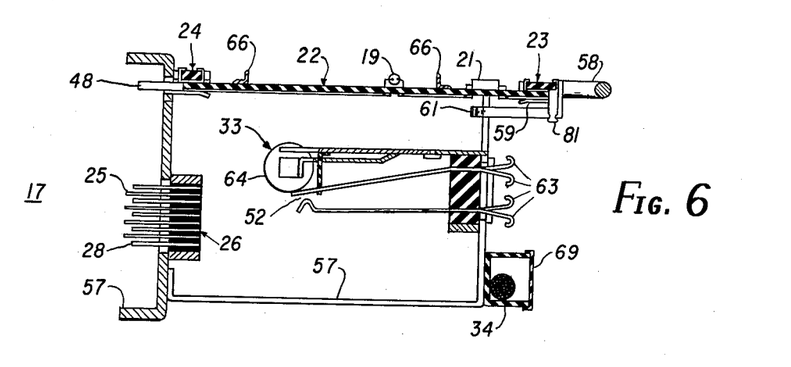
FIG. 6 is a sectional view taken along line 6—6 of FIG. 5.
Figure 7:
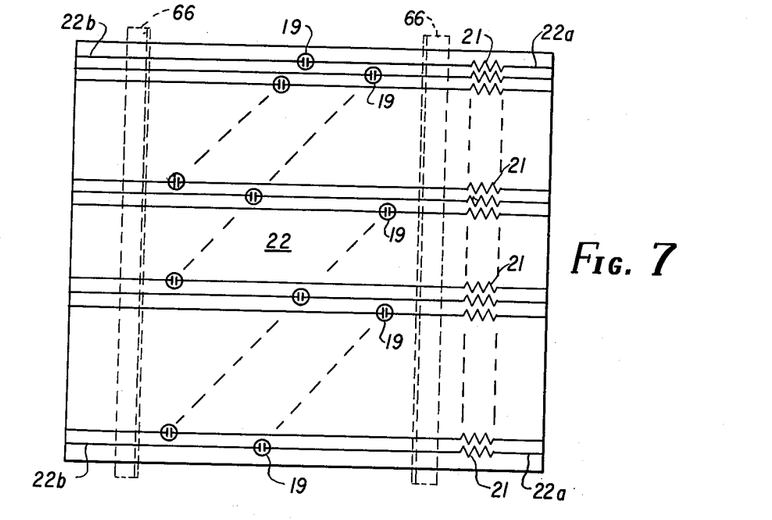
FIG. 7 is a diagrammatic representation of a printed circuit card as used in this invention.

As is most clearly shown in FIGS. 4, 5 and 6, a 110 point terminal block 18 is mounted on each access unit 17 and has a plurality of terminals 32 provided thereon for connection to the telephone system. The wires which are external to the access unit 17 and terminate on the terminal block 18 are fanned through a fanning strip 67 and affixed to the terminals 32.

Three printed circuit boards 22 are supported on each access unit by means of a metal mounting frame 57 and are each positioned and held firmly in place by a pair of removable connecting strips 23 and 24. The first connecting strip 23 slidably engages the printed circuit board 22 by means of spring type female terminals 59, each of which makes electrical connection to one of the printed circuit conductors 22a located on the printed circuit boards 22. Each of the connecting strips 23 has an easily grasped handle 58 to facilitate its placement and removal, and a pair of spring tension locking devices 61 for engagement with the framework 57 to stabilize the positioning when the printed circuit board is properly engaged. The second connecting strip 24 slidably engages each printed circuit board at the side opposite to that engaged by the connecting strip 23 and similarly positions the board and extends the printed circuit through connections 22b and a plurality of female spring connectors 59. Each connecting strip 24 has each individual circuit connector extended as a terminal 48 (seen most clearly on the front of each access unit as shown in FIG. 5), and a pair of spring tension devices 62 located thereon, each of which engages one of two metal strips 66 secured to the circuit card to provide rigidity and positioning facilities.

A bunching block 26, which is centrally located on each access unit 17, comprises a plurality of party-line busses 28 (as shown in FIG. 9A) separated by strips of insulating material 25 and each being formed along one edge into a plurality of input terminals 49 and an output terminal 51. The terminals are formed similar to the above-mentioned terminals 48 to accept the receptacles 81 or 82 of the removable jumpers 27. The circuit connections 22b from the printed circuit boards may thus be selectively and removably extended to one of the party line busses 28 on the bunching block 26 so that assignment to a party-line identification group of each of the one hundred circuits common to each access unit is extremely simple, and reassignment may easily be accomplished.

Each party line bus 28 on the bunching block 26 is wired from its output terminal 51, through a circular opening 68 in the mounting frame 57, to the party terminals 35 located on the unit terminal block 18 to extend a circuit to the MC party relays 29 which are controlled by the ticketer 31 in the conventional manner as described above.

The terminal block 18 of each access unit 17 also has a plurality of line terminals 32 for circuit connections for one hundred connector terminals in the telephone system to the access unit.

Three bar relays 33 are permanently affixed to the mounting frame 57 of each access unit 17. Circuit connections affixed to the terminal 63 of each of the relays are extended through contacts 52 to a plurality of circuit conductors in a cable 34 which are in turn connected to the patch field 12. Here too, with the particular organization of components as shown in FIG. 1, the cables 34 are relatively short and easy to handle.

A stabilizing light assembly, indicated generally at 56 comprising a lamp socket, lamp, and lamp cap is mounted on each access unit mounting frame 57 and is energized from normal telephone exchange battery to supply stabilizing light to the gas filled diodes 19 which are of the light-sensitive type and will not fire in total darkness.

The patch unit 12 comprises a rectangular metal framework 13 having ten party line bunching blocks 14 and ten terminal strips 16 mounted on each of ten vertical members 73 which are affixed to the frame 13. The connections from the telephone system to the patch unit 12, are made on the terminal block 36 which is pivotally mounted to the framework 13 by means of a pair of brackets 74. The circuits are extended from the terminal block 36 through a horizontal conduit 37 and a vertical conduit 38 to the terminal strips 16. The conduits which are affixed to the frame 13 and to the vertical members 73 respectively, provide wire ways for wires affixed to the terminal strips on each vertical mounting member and thereby eliminate the requirement for preformed cable.

The selective connection of circuits extending between the terminals 40 on the terminal strips 16 and the terminal 42 on the adjacent bunching block 14 is accomplished through the use of jumpers 27 of the type described above in conjunction with the access unit. These jumpered connections are made between terminal strips and bunching blocks located immediately adjacent to one another thereby enabling the use of relatively short jumpers and enhancing the compactness and general organization arrangement of the detector of this invention.

The patch unit bunching blocks 14 are similar to the access unit bunching block 26 and selective patching is accomplished in a manner similar to that used in the access unit. The circuits extending into the patch unit 12 are extended to the end 40a on one of the terminals 40 of the terminal strip 16 through the horizontal conduit 37 and the vertical conduit 38, and thence, by means of a jumper 27, removably connected to the end 40b of one of the individual terminals 40 located on each terminal strip 16 to one of the incoming terminals 42 of the party-line bus 43. Each party-line bus 43 is jumpered, from its output terminal 54, to the end 41b of one of the grouping terminals 41 located on the terminal strip 16. The circuit is then extended to the terminal block 36 by means of fixed circuit connections from the end 41a of one of the terminals 41, located on the terminal strip 16, through the vertical conduit 38 and horizontal conduit 39 to the common party-line group terminals on the block 36 and is extended therefrom to the DU party relays 44 which are controlled by the ticketer 31 as described above.

As an example of the flexibility achieved in the detection equipment of this invention, assume that a subscriber changes his residence from one location to another within the same exchange area. The terminal in the central office which is connected to the substation equipment located at the subscriber's old residence is disconnected from the line equipment in the telephone system by removing the connector and is then available for re-assignment. Since it may be necessary to assign new line equipment to the station terminal associated with the station equipment at the subscriber's new residence, a new party designation may be required for the subscriber's new substation. The subscriber may initially have been a party 1 and may subsequently become a party 3. The only changes necessary in the detection equipment are the connection of point C, as shown in FIG. 13, to the new station terminal and the changing of the jumper wires 27 which initially extended from the terminal 48 to the party line group 1 to a terminal on the party line group 3 of the block 26 of the access unit 17. A similar connection change may be made between the patch unit bunching block 14 and a terminal strip 16 located on the patch unit 12. Here again the jumper wire 27 extending from the terminal strip 16 will be switched from the party group 1 to the party group 3 to effect all changes necessary to provide service as required for relocation of the subscriber without change of his directory number.

While the present invention has been described in a particular embodiment, it is understood that changes and modifications may be made therein without departing from the spirit and scope of the invention as defined in the appended claims.

What is claimed is:

1. For use with a frequency per terminal automatic toll ticketing telephone system having a calling station, party identification apparatus, digit register apparatus, and digital recording apparatus, a detector for identification of a calling station comprising: means for connecting the detector to a telephone system; means for commoning each of a plurality of circuits into one of a plurality of party designation groups; and gating means responsive to a potential in said telephone system identified with the calling station for completing a circuit through said commoning means to said party identification apparatus, said digit register apparatus, and said digital recorder, said means for connecting the detector to the telephone system comprising a plurality of access unit terminal blocks having terminals thereon connected to the telephone system; a plurality of patch unit terminal strips adapted to be connected to said telephone system; and shift means for connecting said patch unit terminal strips to said telephone system; commoning means comprising a first bunching means including a plurality of elongated conductors each having a plurality of removable conductor engaging terminals formed thereon, a plurality of first connectors adapted to be selectively positioned at any terminal of one of said conductors for electrically connecting said conductors to said gating means; a plurality of second conductors adapted to be positioned on one terminal of each conductor to connect said conductor with said party identification apparatus and said digit register apparatus; a second bunching means including a plurality of elongated conductors having removable conductor engaging terminals formed thereon; a plurality of removable conductors adapted to be engaged with the terminals on said conductors for selectively connecting the lines of said telephone system to one of said conductors; and a connector engageable with each of said conductors for electrically connecting said conductors with said party identification apparatus and said digit register apparatus.

2. The detector of claim 1 wherein the gating means comprises: a circuit board including a plurality of potential activated circuits; a first connecting strip for removably connecting said circuit board to said connecting means; and a second connecting strip removably connected to the end of said circuit board opposite of said first connected strip to provide a removable link between said gating means and said bunching means, whereby the gating means is removably positioned in the detector.

3. For use with a frequency per terminal automatic toll ticketing telephone system, a detector comprising: a patch field; and a plurality of access units, each including connecting means comprising a terminal block for connecting said access units to said telephone system; gating means including a removably mounted circuit board connected to said connecting means, to effect a potential activated connection between said telephone system and said detector; commoning means including a bunching block having a plurality of busses each having a plurality of terminals; first and second interconnecting means each including a plurality of removable terminal strips for removably engaging said gating means, said first interconnecting means also providing circuit connections between said connecting means and said gating means, said second interconnecting means providing facilities for transposition of circuit conductors between said gating means and said commoning means.

4. For use with a frequency per terminal automatic toll ticketing telephone system, a detector comprising: a plurality of access units, each including access connecting means comprising a terminal block for connecting said access units to said telephone system; gating means including a removably mounted circuit board connected to said access connecting means, to effect a potential activated connection between said telephone system and said detector; access commoning means including a bunching block having a plurality of busses, each having a plurality of terminals; first and second access interconnecting means each including a plurality of removable terminal strips for removably engaging said gating means, said first access interconnecting means also providing circuit connections between said access connecting means and gating means, said second access interconnecting means providing facilities for transposition of circuit conductors between said gating means and said access commoning means; and a patch unit, said patch unit including a terminal block for connecting said patch unit to said telephone system, patch commoning means including a bunching block having a plurality of busses each bus having a plurality of terminals; and patch interconnecting means including a terminal strip for provision of a point between said terminal block and said patch commoning means at which permanently affixed circuit conductors may be transposed to removable circuit conductors.

5. A detector for use in a toll ticketing telephone system having a source of station identifying potential, comprising: a framework; a terminal board mounted on said framework, including a plurality of first and second terminal blocks, each first terminal block being in proximity to each second terminal block to permit selective jumpering therebetween; and a plurality of access units mounted on said framework having circuit connections to said terminal board, each of said access units mounting a plurality of removable circuit boards each having a plurality of circuits, connecting means for mounting said circuit boards, a bunching block positioned in proximity to said connecting means to permit selective jumpering therebetween, and relay means for extending an identifying potential from said access unit to said terminal board.

6. A detector for use in an automatic toll ticketing telephone system having a source of identifying potential comprising: an equipment rack; a terminal board including a plurality of first and second terminal blocks fixed on said equipment rack with said first and second terminal blocks in proximity to one another to permit selective jumpering therebetween; said terminal board being connected to said telephone system; a plurality of prefabricated units fixed to said frame in proximity to said terminal board for cable connection thereto, each of said units including a unit frame adapted to be fixed to said equipment rack and mounting a unit terminal block connected to said cable, a removable circuit board mounting a plurality of circuits, means for supporting said circuit board on said unit frame, a first connecting mounting strip removably connected to said board for positioning said board on said equipment frame and extending said circuits; permanent connecting means extending each circuit from said connecting strip to said unit terminal block, a second connecting strip removably engaged with said circuit board for positioning said board on said unit frame and extending said circuits, a bunching block fixed on said unit frame in proximity to said second connecting strip to permit selective jumpering therebetween, and relay means mounted on said unit frame for extending an identifying potential from the unit terminal block to said terminal board; and means associated with each of said prefabricated units for connecting said detector to said telephone line.

7. In an automatic toll ticketing telephone system operable on a frequency per terminal basis a calling station detector having electromechanical equipment common to a plurality of terminals, comprising: a plurality of access units each including a terminal block connected to the telephone system, a plurality of first relay contacts wired to said terminal block, each contact being associated with one of a plurality of relays, a plurality of conductors each extending from one of said first relay contacts to a permanent connection on one of a plurality of first circuit board connecting units, said connections having the opposing end to that of the permanent connection formed to engage a removable connector, a plurality of printed circuit boards each mounting a plurality of potential activated circuits and being removably connected at one end to one of said first circuit board connecting units, a plurality of second circuit board connecting units removably connected to the end of said circuit boards opposite the first circuit board connecting units, said second connecting units having a plurality of two ended terminals each having one end connected to said circuit board and the opposite formed to engage a removable connector, a plurality of jumper wires having removable connectors formed on either end thereof each having a first end engaged with one of said terminals on said second connecting unit; a bunching block having a plurality of conductors each with a plurality of removable connector engaging terminals formed thereon for engagement with a second end of said jumper wires; a plurality of relay coils associated with said relays electrically connected to said terminal block, said relays having a plurality of second contacts connected to wires formed in a cable; and a patch unit, said unit including connection with the wires of said cables, and conductors for extending connection from said patch unit to said telephone system.

8. In an automatic toll ticketing telephone system operable on a frequency per terminal basis, a calling station detector having electromechanical equipment common to a plurality of terminals comprising: a patch unit including a plurality of terminal strips each including a plurality of two ended terminals each having a permanent connection with the wires of a cable at one end thereof, and at the other end being formed to engage a removable connector; a frame-work having a plurality of mounting members for mounting said terminal strips thereon, a plurality of bunching blocks mounted on said mounting members each having a plurality of conductors which in turn are each formed with a plurality of terminals for engaging a removable connector, a plurality of jumper wires each equipped with a removable connector on either end thereof for interconnecting said bunching blocks and said terminal strips, first conduit means on the rear of each mounting member to provide a wire way for wires connected to said terminal strips, a terminal block on the rear of said frame for extending connections from said patch unit to said telephone system and second conduit means on the rear of said frame for guiding wires from said unit terminal block to said first conduit means; and a plurality of access units having circuit connections with the wires of said cables and being connected through said cables to said patch unit.

9. In an automatic toll ticketing system which is operable on a frequency per terminal basis a calling station detector having electromechanical equipment common to a plurality of terminals, comprising: a plurality of access units, each access unit including a terminal block connected to the C leads of each connector bank terminal in the telephone system, a plurality of first relay contacts wired through conduit to said terminal block, each contact being associated with one of a plurality of relays, a plurality of conductors each extending from one of said first relay contacts to a permanent connection on one of a plurality of circuit board connecting units, said connections having the opposing end to that of the permanent connection formed to engage a removable connector, a plurality of printed circuit boards each mounting a plurality of circuits, including a gas diode, a resistor and being connected at one end to one of said first circuit board connecting units, a plurality of second circuit board connecting units connected to the end of said circuit boards opposite the first circuit board connecting units, said second connecting units having a plurality of two ended terminals each having one end connected to said circuit board and the opposite end formed to engage a removable connector, a plurality of jumper wires having removable connectors formed at either end thereof each having a first end engaged with one of said terminals on said connecting unit, a bunching block having a plurality of conductors each with a plurality of removable connector engaging terminals formed thereon and each engaged with the second end of said jumper wires, a plurality of relay coils associated with said relays also connected through said conduit to said terminal block, said relays having a plurality of second contacts connected to a cable; and a patch unit connected through a plurality of said cables to a plurality of said access units, said patch unit including a plurality of terminal strips each including a plurality of two-ended terminals each having a permanent connection with the wires in said cables at one end thereof and the other end being formed to engage a removable connector, a framework having a plurality of mounting members for mounting said terminal strips thereon, a plurality of bunching blocks mounted on said mounting members each having a plurality of conductors which in turn are formed with a plurality of terminals for engaging a removable connector, a plurality of jumper wires each equipped with removable connectors at either end thereof for connecting said bunching blocks and said terminal strips, first conduit means on the rear of each mounting member to provide a wire way for wires connected to said terminal strips, a terminal block on the rear of said frame for extending connections from said patch unit to said telephone system and second conduit means secured to said frame for guiding wires from said unit terminal block to said first conduit means.

10. In an automatic toll ticketing telephone system operable on a frequency per terminal basis, a calling station detector including an access unit and a patch unit, comprising: an access unit terminal block connected to the telephone system; a plurality of first relay contacts wired, through conduit, to said access unit terminal block, each contact being associated with one of a plurality of relays; a plurality of conductors each extending from one of said first relay contacts to a permanent connection on one of a plurality of circuit board connecting units, said connections having the opposing end to that of the permanent connection formed to engage a removable connector; a plurality of printed circuit boards each mounting a plurality of circuits, each circuit including a gas diode, a resistor, and a connector at either end thereof and being connected at one end to one of said first circuit board connecting units; a plurality of second circuit board connecting units connected to the end of said circuit boards opposite the first circuit board connecting units, said second connecting units having a plurality of two ended terminals each having one end connected to said circuit board and the opposite end formed to engage a removable connector; a plurality of jumper wires having removable connectors formed on either end thereof each having a first end engaged with one of said terminals on said connecting unit; an access bunching block, said block having a plurality of conductors each with a plurality of removable connector engaging terminals formed thereon and each engaged with the second end of said jumper wires; a plurality of relay coils associated with said relays also connected through said conduit to said access unit terminal block, said relays having a plurality of second contacts connected to a cable; plurality of patch terminal strips each including a plurality of two ended terminals each having a permanent connection with the wires in said cable at one end thereof and the other end being formed to engage a removable connector; a framework having a plurality of vertical mounting members for mounting said patch terminal strips thereon; a plurality of patch bunching blocks mounted on said mounting members each having a plurality of conductors which in turn are each formed with a plurality of terminals for engaging a removable connector; a plurality of jumper wires each equipped with removable connectors at either end thereof for connecting said patch bunching blocks and said patch terminal strips; a first conduit means on the rear of each mounting member to provide a wire way for wires connected to said patch terminal strips; a patch unit terminal block on the rear of said frame for extending connection from said patch unit to said telephone system; and second conduit means secured to said frame for guiding wires from said patch unit terminal block to said first conduit means.

References Cited in the file of this patent

UNITED STATES PATENTS

| | | |
|---|---|---|
| 2,562,694 | Bielenberg | July 31, 1951 |
| 2,600,502 | Holden | June 17, 1952 |
| 2,698,880 | Shepherd | Jan. 4, 1955 |
| 2,733,297 | Matlack et al. | Jan. 31, 1956 |
| 2,785,228 | Gulbrandsen | Mar. 12, 1957 |